(12) United States Patent
McWaid et al.

(10) Patent No.: US 12,203,185 B2
(45) Date of Patent: Jan. 21, 2025

(54) ELECTROLYZER CELL AND METHODS OF USING AND MANUFACTURING THE SAME

(71) Applicant: Verdagy, Inc., Moss Landing, CA (US)

(72) Inventors: Thomas H. McWaid, Santa Cruz, CA (US); James R. Penny, Santa Cruz, CA (US); Shizhao Su, Marina, CA (US)

(73) Assignee: Verdagy, Inc., Moss Landing, CA (US)

( * ) Notice: Subject to any disclaimer, the term of this patent is extended or adjusted under 35 U.S.C. 154(b) by 0 days.

(21) Appl. No.: 18/163,010

(22) Filed: Feb. 1, 2023

(65) Prior Publication Data

US 2023/0243047 A1  Aug. 3, 2023

Related U.S. Application Data

(60) Provisional application No. 63/305,473, filed on Feb. 1, 2022.

(51) Int. Cl.
| | |
|---|---|
| *C25B 1/00* | (2021.01) |
| *C25B 1/04* | (2021.01) |
| *C25B 9/19* | (2021.01) |
| *C25B 9/23* | (2021.01) |
| *C25B 9/63* | (2021.01) |
| *C25B 11/03* | (2021.01) |
| *C25B 11/055* | (2021.01) |
| *C25B 15/08* | (2006.01) |

(52) U.S. Cl.
CPC ............... *C25B 9/19* (2021.01); *C25B 1/04* (2013.01); *C25B 9/23* (2021.01); *C25B 9/63* (2021.01); *C25B 11/03* (2013.01); *C25B 11/055* (2021.01); *C25B 15/08* (2013.01)

(58) Field of Classification Search
CPC .... C25B 9/19; C25B 9/63; C25B 9/23; C25B 11/055; C25B 1/04; C25B 11/03; C25B 15/08
See application file for complete search history.

(56) References Cited

U.S. PATENT DOCUMENTS

| | | | |
|---|---|---|---|
| 3,677,927 A | 7/1972 | Raetzsch et al. | |
| 3,884,791 A | 5/1975 | Raetzsch et al. | |
| 3,902,985 A | 9/1975 | Raetzsch et al. | |
| 4,217,199 A | 8/1980 | Cunningham | |
| 2017/0342576 A1* | 11/2017 | McWaid | C25B 9/19 |

(Continued)

FOREIGN PATENT DOCUMENTS

WO    2023150554    8/2023

OTHER PUBLICATIONS

"International Application Serial No. PCT US2023 061752, International Search Report mailed Jul. 18, 2023", 3 pgs.

(Continued)

*Primary Examiner* — Zulmariam Mendez
(74) *Attorney, Agent, or Firm* — Schwegman Lundberg & Woessner, P.A.

(57) ABSTRACT

An electrolyzer cell comprises a first half cell comprising a housing at least partially enclosing a cell interior, a first electrode coated with a first catalyst coating, wherein the first electrode is coupled to the housing in the cell interior without welding, a second electrode coupled to the housing in the cell interior without welding, and a separator positioned between the first electrode and the second electrode, wherein a voltage is applied between the first electrode and the second electrode.

20 Claims, 4 Drawing Sheets

(56) References Cited

U.S. PATENT DOCUMENTS

2018/0148848 A1* 5/2018 Shannon .................. C25B 1/24
2020/0181783 A1 6/2020 But
2020/0340130 A1* 10/2020 Tanaka ..................... C25B 9/77

OTHER PUBLICATIONS

"International Application Serial No. PCT US2023 061752, Written Opinion mailed Jul. 18, 2023", 7 pgs.

* cited by examiner

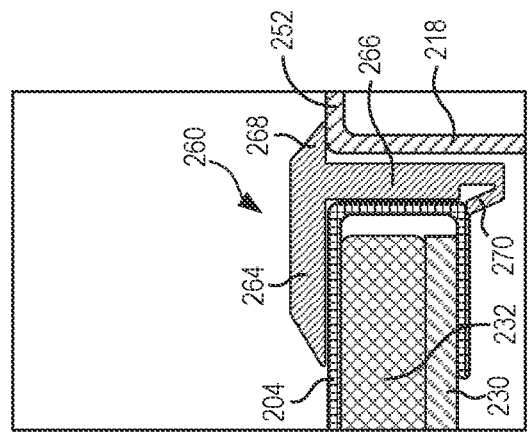
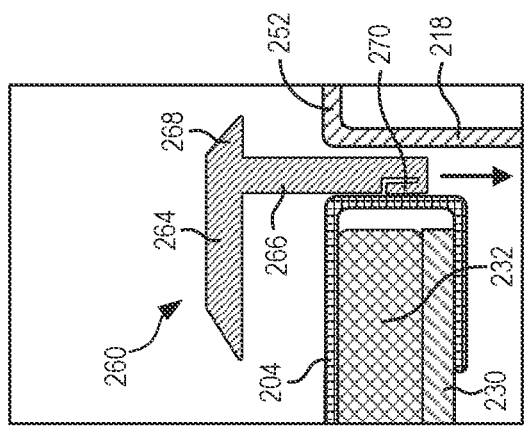
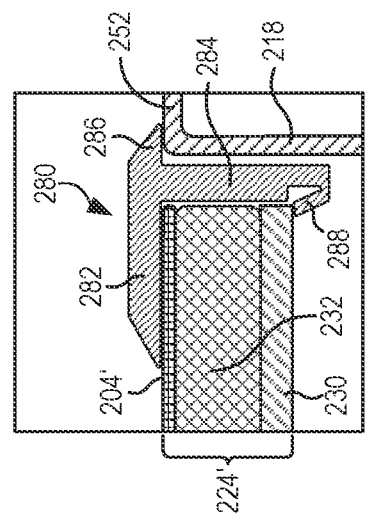
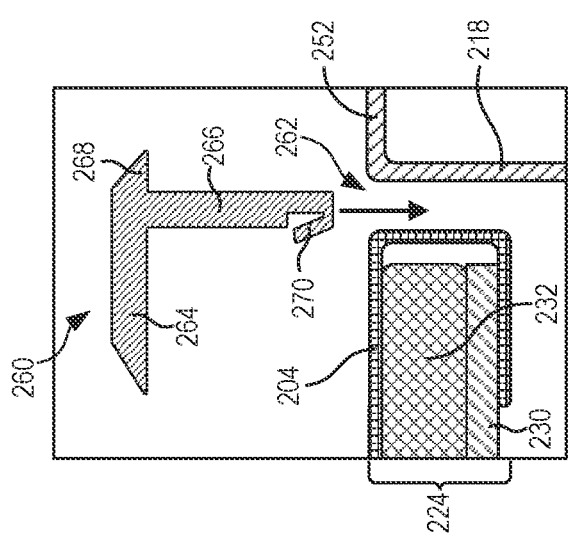

ELECTROLYZER CELL AND METHODS OF USING AND MANUFACTURING THE SAME

CROSS-REFERENCE TO RELATED APPLICATION

This application claims priority under 35 U.S.C. § 119(e) to U.S. Provisional Application Ser. No. 63/305,473, filed on Feb. 1, 2022, entitled "DETACHABLE ELECTRODES FOR AN ELECTROLYZER CELL," the disclosure of which is incorporated herein by reference in its entirety.

BACKGROUND

The production of hydrogen can play an important role because hydrogen gas is required for many chemical processes. As of 2019, roughly 70 million tons of hydrogen is produced annually worldwide for various uses, such as oil refining, in the production of ammonia (through the Haber process), in the production of methanol (though reduction of carbon monoxide), or as a fuel in transportation.

Historically, a large majority of hydrogen (~95%) has been produced from fossil fuels (e.g., by steam reforming of natural gas, partial oxidation of methane, or coal gasification). Other methods of hydrogen production include biomass gasification, low- or no-$CO_2$ emission methane pyrolysis, and electrolysis of water. Electrolysis uses electricity to split water molecules into hydrogen gas and oxygen gas. To date, electrolysis systems and methods have been generally more expensive than fossil-fuel based production methods. However, the fossil-fuel based methods can be more environmentally damaging, generally resulting in increased $CO_2$ emissions. Therefore, there is a need for cost-competitive and environmentally-friendly methods of hydrogen gas producing electrolysis systems and methods.

SUMMARY

The present disclosure describes an electrolyzer cell comprising a housing at least partially enclosing a cell interior, a first electrode coated with a first catalyst coating, wherein the first electrode is coupled to the housing in the cell interior without welding, a second electrode coupled to the housing in the cell interior without welding, and a separator positioned between the first electrode and the second electrode, wherein a voltage is applied between the first electrode and the second electrode.

The present disclosure also describes a method comprising providing a first electrode coated with a first catalyst coating and a second electrode, coupling the first electrode to a housing of an electrolyzer cell without welding so that the first electrode is in a cell interior of the housing, coupling the second electrode to the housing in the cell interior without welding, positioning a separator between the first electrode and the second electrode, feeding electrolyte into the cell interior, and applying a voltage between the first electrode and the second electrode to generate hydrogen gas at the first electrode or at the second electrode.

The present disclosure also describes a method of maintaining an electrolyzer cell, wherein the method comprises removing an electrolyzer cell from an electrolyzer system, wherein the electrolyzer cell comprises a housing at least partially enclosing a cell interior, a first electrode coated with a first catalyst coating, wherein the first electrode is coupled to the housing in the cell interior without welding, a second electrode coupled to the housing in the cell interior without welding, and a separator positioned between the first electrode and the second electrode, removing the first electrode from the electrolyzer cell, replacing the removed first electrode with a replacement electrode coated with a replacement catalyst coating, and coupling the replacement electrode to the housing in the cell interior without welding.

BRIEF DESCRIPTION OF THE FIGURES

The drawings illustrate generally, by way of example, but not by way of limitation, various embodiments discussed in the present document.

FIGS. 5A-5C show close-up cross-sectional views of an edge insert for engaging an example electrode assembly for use in an electrolyzer cell.

FIG. 6 is a close-up cross-section view of another example electrode assembly being engaged by an edge insert.

DETAILED DESCRIPTION

Figure 1:
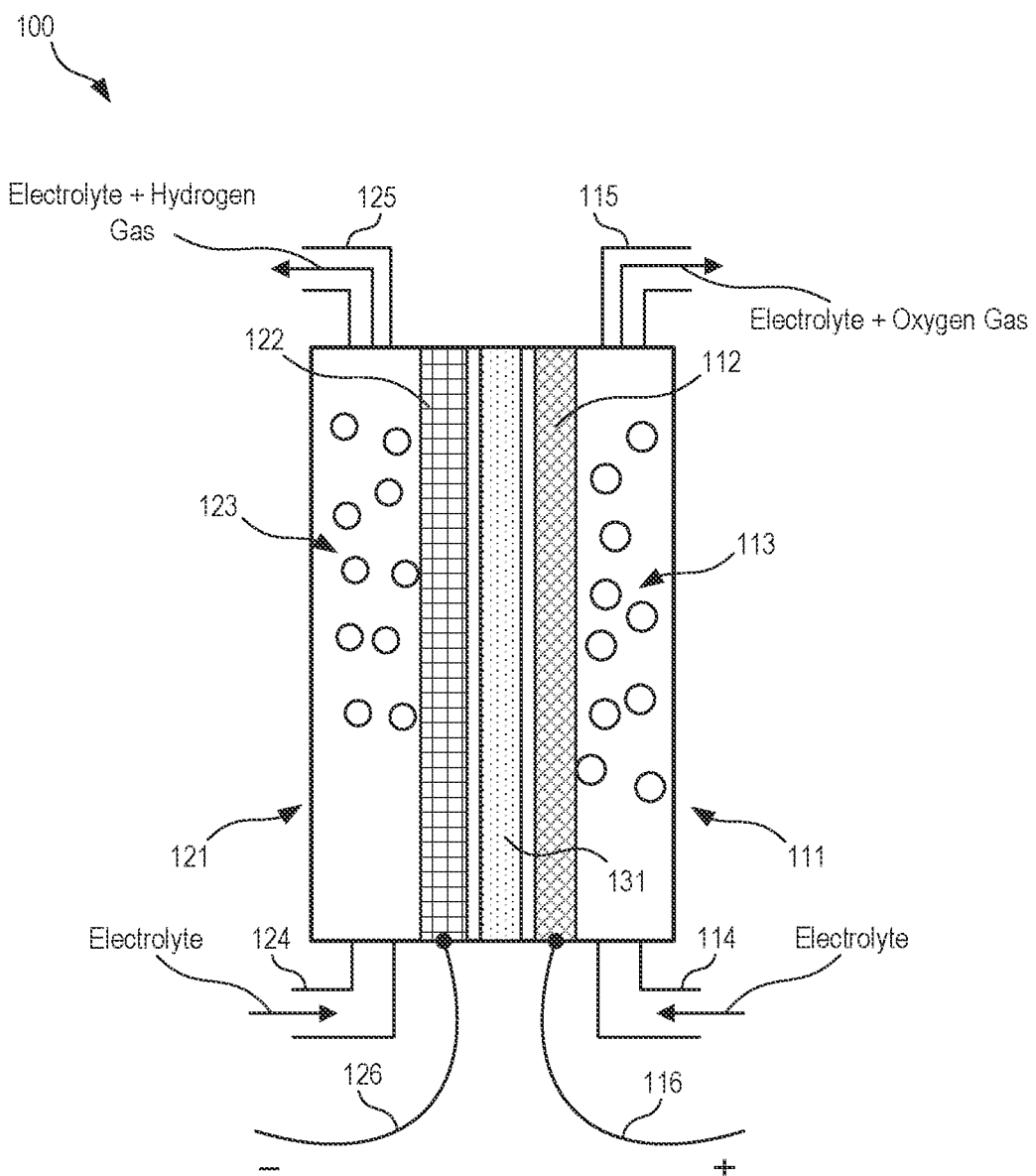
FIG. 1 is a schematic diagram of an example electrolyzer cell for the electrolysis of water to produce hydrogen gas.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The example embodiments may be combined, other embodiments may be utilized, or structural, and logical changes may be made without departing from the scope of the present invention. While the disclosed subject matter will be described in conjunction with the enumerated claims, it will be understood that the exemplified subject matter is not intended to limit the claims to the disclosed subject matter. The following detailed description is, therefore, not to be taken in a limiting sense, and the scope of the present invention is defined by the appended claims and their equivalents.

References in the specification to "one embodiment", "an embodiment," "an example embodiment." etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a recited range of values of "about 0.1 to about 5' should be interpreted to include not only the explicitly recited values of about 0.1 and about 5, but also all individual concentrations within the indicated range of values (e.g., 1, 1.23, 2, 2.85, 3, 3.529, and 4, to name just a few) as well as sub-ranges that fall within the recited range (e.g., about 0.1 to about 0.5, about 1.21 to about 2.36, about 3.3 to about 4.9, or about 1.2 to about 4.7, to name just a few). The statement "about X to Y" has the same meaning as "about X to about Y,"" unless indicated otherwise. Likewise, the statement "about X, Y, or about Z" has the same meaning as "about X, about Y, or about Z." unless indicated otherwise.

In this document, the terms "a," "an," or "the" are used to include one or more than one unless the context clearly dictates otherwise. The term "or" is used to refer to a nonexclusive "or" unless otherwise indicated. Unless indicated otherwise, the statement "at least one of" when referring to a listed group is used to mean one or any combination of two or more of the members of the group. For example, the statement "at least one of A, B, and C" can have the same meaning as "A; B; C; A and B; A and C; B and C; or A, B, and C." or the statement "at least one of D, E. F, and G" can have the same meaning as "D; E; F; G; D and E; D and F; D and G; E and F; E and G; F and G; D, E, and F; D, E, and G; D, F, and G; E, F, and G; or D, E, F, and G." A comma can be used as a delimiter or digit group separator to the left or right of a decimal mark; for example. "0.000,1"" is equivalent to "0.0001."

In the methods described herein, the steps can be carried out in any order without departing from the principles of the invention, except when a temporal or operational sequence is explicitly recited. Furthermore, specified steps can be carried out concurrently unless explicit language recites that they be carried out separately. For example, a recited act of doing X and a recited act of doing Y can be conducted simultaneously within a single operation, and the resulting process will fall within the literal scope of the process. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E (including with one or more steps being performed concurrent with step A or Step E), and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, within 1%, within 0.5%, within 0.1%, within 0.05%, within 0.01%, within 0.005%, or within 0.001% of a stated value or of a stated limit of a range, and includes the exact stated value or range.

The term "substantially" as used herein refers to a majority of, or mostly, such as at least about 50%, 60%, 70%, 80%, 90%, 95%, 96%, 97%, 98%, 99%, 99.5%, 99.9%, 99.99%, or at least about 99.999% or more, or 100%.

In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Hydrogen gas ($H_2$) can be formed electrochemically by a water-splitting reaction where water is split into oxygen gas ($O_2$) and $H_2$ gas at an anode and a cathode of an electrochemical cell, respectively. Examples of such electrochemical processes include, without limitation, proton electrolyte membrane (PEM) electrolysis and alkaline water electrolysis (AWE). In such electrochemical reactions, the operating energy necessary to drive the water-splitting electrolysis reaction is high due to additional energy costs as a result of various energy inefficiencies. For example, to reduce unwanted migration of ionic species between the electrodes, the cathode and the anode may be separated by a separator, such as a membrane, which can reduce migration of the ionic species. Although the separator can improve the overall efficiency of the cell, it can come at a cost of additional resistive losses in the cell, which in turn increases the operating voltage. Other inefficiencies in water electrolysis can include solution resistance losses, electric conduction inefficiencies, and/or electrode over-potentials, among others.

FIG. 1 is a schematic diagram of a generic water electrolyzer cell 100 that converts water ($H_2O$) into hydrogen gas ($H_2$) and oxygen gas ($O_2$) with electrical power. In an example, the electrolyzer cell 100 comprises a housing, e.g., an overall chassis structure that defines and at least partially encloses an interior of the cell 100. The housing can divide the cell 100 into two half cells: a first half cell 111 and a second half cell 121. In an example, the first and second half cells 111, 121 are separated by a separator 131, such as a membrane 131. In an example, the separator 131 comprises a porous membrane (e.g., a microporous membrane or a nanoporous membrane), an ion-exchange membrane, or an ion solvating membrane. In examples wherein the separator 131 comprises an ion-exchange membrane, the membrane can be of different types, such as an anion exchange membrane (AEM), a cation exchange membrane (CEM), a proton exchange membrane (PEM), or a bipolar ion exchange membrane (BEM).

In examples where the separator 131 is a cation exchange membrane, the cation exchange membrane can be a conventional membrane such as those available from, for example, Asahi Kasei Corp. of Tokyo, Japan, or from Membrane International Inc. of Glen Rock, NJ, USA, or from The Chemours Company of Wilmington, DE, USA. Examples of cation exchange membranes include, but are not limited to, the membrane sold under the N2030WX trade name by The Chemours Company and the membrane sold under the F8020/F8080 or F6801 trade names by the Asahi Kasei Corp. Examples of materials that can be used to form a cationic exchange membrane include, but are not limited to, a perfluorinated polymer containing anionic groups, for example sulphonic and/or carboxylic groups. It may be appreciated, however, that in some examples, depending on the need to restrict or allow migration of a specific cation or an anion species between the electrolytes, a cation exchange membrane that is more restrictive and thus allows migration of one species of cations while restricting the migration of another species of cations may be used. Similarly, in some embodiments, depending on the need to restrict or allow migration of a specific anion species between the electrolytes, an anion exchange membrane that is more restrictive and thus allows migration of one species of anions while restricting the migration of another species of anions may be used. Such restrictive cation exchange membranes and anion exchange membranes are commercially available and can be selected by one ordinarily skilled in the art.

In some examples, the separator 131 can be selected so that it can function in an acidic and/or an alkaline electrolytic solution, as appropriate. Other properties for the separator 131 that may be desirable include, but are not limited to, high ion selectivity, low ionic resistance, high burst strength, and high stability in electrolytic solution in a temperature range of room temperature to 150° C. or higher.

In an example, the separator 131 is stable in a temperature range of from about 0° C. to about 150° C., for example from about 0° C. to about 100° C. such as from about 0° C. to about 90° C., for example from about 0° C. to about 80° C., such as from about 0° C. to about 70° C., for example from about 0° C. to about 60° C., such as from about 0° C. to about 50° C., for example from about 0° C. to about 40° C., or such as from about 0° C. to about 30° C.

It may be useful to use an ion-specific ion exchange membrane that allows migration of one type of ion (e.g., cation for a CEM and anion for an AEM) but not another, or migration of one type of ion and not another, to achieve a desired product or products in the electrolyte solution.

In an example, the first half cell 111 comprises a first electrode 112, which can be placed proximate to the separator 131, and the second half cell 121 comprises a second electrode 122, which can be placed proximate to the separator 131, for example on an opposite side of the separator 131 from the first electrode 112. In an example, the first electrode 112 is the anode for the electrolyzer cell 100 and the second electrode 122 is the cathode for the electrolyzer cell 100, such that for the remainder of the present disclosure the first half cell 111 may also be referred to as the anode half cell 111, the first electrode 112 may also be referred to as the anode 112, the second half cell 121 may also be referred to as the cathode half cell 121, and the second electrode 122 may also be referred to as the cathode 122. Each of the electrodes 112, 122 can be coated with one or more electrocatalysts to speed the reaction toward the hydrogen gas ($H_2$ gas) and/or the oxygen gas ($O_2$ gas). Examples of electrocatalysts include, but are not limited to, highly dispersed metals or alloys of platinum group metals, such as platinum, palladium, ruthenium, rhodium, iridium, or their combinations such as platinum-rhodium, platinum-ruthenium, a nickel mesh coated with ruthenium oxide ($RuO_2$), or a high-surface area nickel.

The ohmic resistance of the separator 131 can affect the voltage drop across the anode 112 and the cathode 122. For example, as the ohmic resistance of the separator 131 increases, the voltage across the anode 112 and the cathode 122 may increase, and vice versa. In an example, the separator 131 has a relatively low ohmic resistance and a relatively high ionic mobility. In an example, the separator 131 has a relatively high hydration characteristics that increase with temperature, and thus decreases the ohmic resistance. By selecting a separator 131 with lower ohmic resistance known in the art, the voltage drop across the anode 112 and the cathode 122 at a specified temperature can be lowered.

In an example, the anode 112 is electrically connected to an external positive conductor 116 (also referred to as "the anode conductor 116") and the cathode 122 is electrically connected to an external negative conductor 126 (also referred to as "the cathode conductor 126"). When the separator 131 is wet and is in electrolytic contact with the electrodes 112 and 122, and an appropriate voltage is applied across the conductors 116 and 126, $O_2$ gas is liberated at the anode 112 and $H_2$ gas is liberated at the cathode 122. In certain configurations, an electrolyte, e.g., one comprising of a solution of KOH in water, is fed into the half cells 111, 121. For example, the electrolyte can flow into the anode half cell 111 through a first electrolyte inlet 114 and into the cathode half cell 121 through a second electrolyte inlet 124. In an example, the flow of the electrolyte through the anode half cell 111 picks up produced $O_2$ gas as bubbles 113 and exits the anode half cell 111 through a first outlet 115. Similarly, the flow of the electrolyte through the cathode half-cell 121 can pick up produced $H_2$ gas as bubbles 123 and can exit the cathode half cell 121 through a second outlet 125. The gases can be separated from the electrolyte downstream of the electrolyzer cell 100 with one or more appropriate separators. In an example, the produced $H_2$ gas is dried and harvested into high pressure canisters or fed into further process elements. The $O_2$ gas can be allowed to simply vent into the atmosphere or can be stored for other uses. In an example, the electrolyte is recycled back into the half cells 111, 121 as needed.

In an example, a typical voltage across the electrolyzer cell 100 (e.g., the voltage difference between the anode conductor 116 and the cathode conductor 126) is from about 1.5 volts (V) to about 3.0 V. In an example, an operating current density for the electrolyzer cell 100 is from about 0.1 $A/cm^2$ to about 3 $A/cm^2$. Each cell 100 has a size that is sufficiently large to produce a sizeable amount of Hz gas when operating at these current densities. In an example, an active area of each cell 100 (e.g., a width multiplied by a height for a rectangular cell) is from about 0.25 square meters ($m^2$) to about 15 $m^2$, such as from about 1 $m^2$ to about 5 $m^2$, for example from about 2 $m^2$ to about 4 $m^2$, such as from about 2.25 $m^2$ to about 3 $m^2$, such as from about 2.5 $m^2$ to about 2.9 $m^2$. In an example, the total volume of each cell (e.g., a width multiplied by a height multiplied by a depth) is from about 0.1 cubic meter (m) to about 2 $m^3$, such as from about 0.15 $m^3$ to about 1.5 $m^3$, for example from about 0.2 $m^3$ to about 1 $m^3$, such as from about 0.25 $m^3$ to about 0.5 $m^3$, for example from about 0.275 $m^3$ to about 0.3 $m^3$. In an example, the total volume of the entire electrolyzer system (e.g., the combined volume of all the cells in all the stacks in the plant) is from about 1 $m^3$ to about 25,000 $m^3$, such as from about 5 $m^3$ to about 2,500 $m^3$, for example from about 10 $m^3$ to about 100 $m^3$, such as from about 25 $m^3$ to about 75 $m^3$, for example from about 30 $m^3$ to about 50 $m^3$.

Detachable Electrode Assembly

As discussed above, the efficiency of an electrolyzer cell can depend on resistive losses between the anode and cathode. One parameter that can affect the ohmic resistance between the electrodes is the distance between the anode and the cathode, with a larger gap between the electrodes resulting in a correspondingly larger resistance compared to a smaller gap. Therefore, in an example, an electrolyzer cell can be configured so that the space or gap between the anode and the cathode is as small as possible. In one example configuration, one or both of the anode and the cathode are positioned so that the electrode is in contact with the separator, which is also referred to as a "zero-gap" configuration. In an example of a zero gap configuration, one face or surface of the anode is in contact with a first surface of the separator and one face or surface of the cathode is in contact with an opposing second surface of the separator.

Zero-gap technology has been used for some time in the chlor-alkali industry. Most or all chlor-alkali, zero-gap configurations include a cathode current collector (such as a sheet of expanded nickel) that is welded to supports (such as support ribs) that are, in turn, welded to the cathode half cell. The anode, which is typically fabricated out of titanium, contains a sheet of expanded titanium that is welded to supports that are in turn welded to the anode half cell. The expanded titanium sheet anode is typically coated with a platinum group metal-containing catalyst. Typically, the titanium structure of the anode side supports the separator (e.g., a membrane). In an example, an elastic element is positioned adjacent to the cathode-side expanded nickel sheet and a coated fine woven mesh is then folded over the elastic member and is thereby secured under the expanded nickel sheet. This cathode assembly can then be positioned onto the anode assembly, which includes the supported separator (e.g., the membrane supported by the expanded titanium sheet of the anode). This overall structure can be compressed, thereby loading the woven mesh on the cathode side against both the elastic element and the membrane, the membrane onto the anode-side expanded titanium sheet, and the elastic element onto the cathode-side expanded nickel sheet, resulting in a zero gap structure. The coated expanded titanium sheet forms the anode electrode and the coated fine nickel mesh forms the cathode electrode, with the expanded nickel sheet acting as a cathode current collector.

Zero-gap architecture minimizes or eliminates the relatively resistive fluid gaps between an electrode and the separator, which in turn reduces the distance between the electrodes in the electrolyzer cell, thereby minimizing a dominant source of high cell voltages. However, a zero-gap architecture will be most beneficial if contact resistance across the two electrode contacts is small. For example, the zero-gap architecture can be enabled by the low electrical contact resistance typical of nickel-nickel contacts and the small contact resistance between a surface coated with a platinum group metal catalyst and another nickel surface.

Typically, both electrodes are coated with one or more catalyst coating compositions. The catalyst coating materials have a finite service life—and that life is typically inversely proportional to the current density at which the electrolyzer cell is operated. The voltage that is required to be applied across the cell for the same hydrogen gas production will increase as the catalyst coating material or materials degrade over time. At some point, it becomes economically advantageous to replace one or both of the electrodes to restore full catalyst activity within the cell.

In previous cells, one or both electrodes are coupled to a supporting structure with welds to ensure electrical connection between the electrode and the support structure. However, such a welded connection between the electrode and the rest of the cell structure can make the process of replacing an electrode more time consuming and more labor intensive. Maintenance of the cell can require disassembly of the entire cell, breaking of the welds, replacement of the electrode, and rewelding, before the cell can be brought back online.

Figure 2:
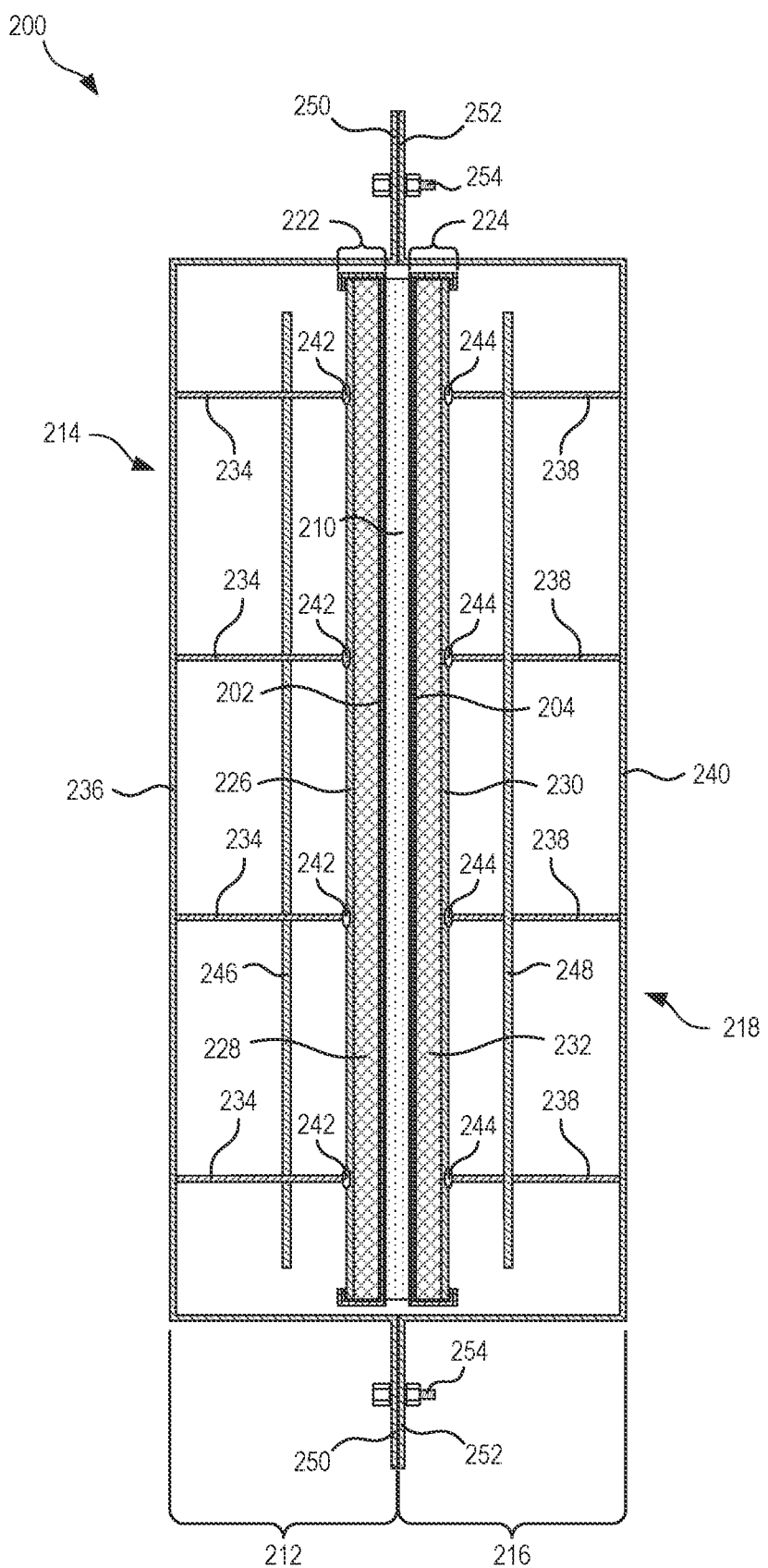
FIG. 2 is a cross-sectional view of an example electrolyzer cell comprising an anode pan assembly and a cathode pan assembly separated by a separator.

FIG. 2 shows an example of an electrolyzer cell pan structure 200 that can provide for a zero gap architecture, e.g., with one or both electrodes compressed against the separator, without the electrodes being welded to any other structure of the electrolyzer cell 200. The electrolyzer cell 200 a housing that at least partially encloses a cell interior and includes electrodes 202, 204 coupled to the housing in the cell interior, wherein each electrode 202, 204 can be part of a corresponding half cell. For example, the first electrode 202 is included as part of a first half cell and the second electrode 204 is included as part of a second half cell. In a non-limiting example, the first electrode 202 is the anode of the electrolyzer cell 200 and the second electrode 204 is the cathode of the electrolyzer cell 200, such that the electrodes 202, 204 will also be referred to as the anode 202 and the cathode 204, and the corresponding half cells will also be referred to as the anode half cell and the cathode half cell. However, there are instances when the anode 202 and the cathode 204 are referred to more generically as "the electrode 202, 204" or "the electrodes 202, 204."

A separator 210 can be situated between the anode half cell and the cathode half cell, for example by being positioned between the anode 202 and the cathode 204. As discussed above, the separator 210 can be configured to reduce migration of certain species between the electrodes 202, 204 while allowing one or more other species to pass from the anode half cell to the cathode half cell and/or from the cathode half cell to the anode half cell. In an example, the separator 210 comprises a diaphragm, a membrane electrode assembly (MEA), or a membrane, such as an ion exchange membrane (IEM) (e.g., an anion exchange membrane (AEM), a cation exchange membrane (CEM), or a proton exchange membrane (PEM)), a bipolar ion exchange membrane (BEM), an ion solvating membrane (ISM), or a microporous or nanoporous membrane. In some examples, the separator 210 can comprise more than one type of separator, e.g., more than one type of membrane (as is the case with a bipolar ion exchange membrane), and/or can be part of a composite structure (such as a membrane electrode assembly (MEA)), which can also include one or more separator components (e.g., to separate an anion exchange membrane (AEM) from a cation exchange membrane (CEM)), or one or more support structures to provide mechanical integrity to the one or more separators. In addition to these components, individual gaskets or gasket tape may be provided in between and along the outer perimeter of the components to seal the compartments from fluid leakage.

As discussed above, in an example, each of the electrodes 202, 204 is situated in a "zero-gap" configuration relative to the separator 210. Although the term "zero-gap" would typically imply that one or both electrodes 202, 204 are in actual physical contact with the separator 210, in the present disclosure, the term "zero-gap" is expanded to mean that all structures between the two current collectors 226, 230 (described below) are in mechanical contact with no space for the liquid electrolyte to congregate. In other words, there could be one or more spacer materials inserted between one or both of the current collectors 226, 230 and the separator 210, and the overall structure would still be considered a "zero-gap architecture." as that term is being used herein, so long as there is not a liquid electrolyte gap between the two current collectors 226, 230.

The housing of the cell 200 can comprise a pan assembly for one or both of the half cells. In an example, each pan assembly includes a pan with an interior for receiving an electrolyte. For example, the anode half cell can include an anode pan assembly 212 comprising an anode-side pan 214 for receiving an anolyte and the cathode half cell can include a corresponding cathode pan assembly 216 comprising a cathode-side pan 218 for receiving a catholyte. The pan assemblies 212, 216 can be configured so that the electrolyte flowing through the pan 214, 218 will come into contact with its corresponding electrode 202, 204, e.g., so that $H_2$ gas can be evolved from the cathode 204 and, in some examples, so that 02 gas can be evolved from the anode 202. Each pan assembly 212, 216 can also include an inlet for receiving electrolyte into the interior of the pan 214, 218, and one or more outlets so that electrolyte and evolved gas can exit the pan 214, 218 (not shown).

In an example, each electrode 202, 204 is electrically connected to its corresponding pan 214, 218 so that electrical current can flow from the pan 214, 218 to the electrode 202, 204 (as is the case for current flowing from an anode-side pan 214 to an anode 202) or from the electrode 202, 204 to the pan 214, 218 (as is the case for current flowing from a cathode 204 to a cathode-side pan 218). Each half cell can include one or more additional structures to provide for the electrical connection between the electrodes 202, 204 and the pans 214, 218. For example, one or both of the electrodes 202, 204 can be part of a corresponding electrode assembly comprising the electrode 202, 204 and one or more additional structures that enhance operation of the electrolyzer cell 200. For example, the first electrode 202 (e.g., the anode 202) can be part of a first electrode assembly 222 (which will also be referred to herein as "the anode assembly 222") and the second electrode 204 (e.g., the cathode 204) can be part of a second electrode assembly 224 (which will also be referred to herein as "the cathode assembly 224").

In an example, one or both of the electrode assemblies 222, 224 include its corresponding electrode 202, 204, a current collector, and an optional elastic element (also sometimes referred to as a "mattress"). In an example, the anode assembly 222 includes the anode 202, an anode current collector 226 and an optional anode-side elastic element 228. Similarly, in an example, the cathode assembly 224 includes the cathode 204, a cathode current collector 230, and an optional cathode-side elastic element 232.

Each electrode assembly 212, 214 is coupled to its respective pan 214, 218, i.e., so that there is an electrical connection between the anode 202 and the anode-side pan 214 and between the cathode 204 and the cathode-side pan 218. In an example, one or both of the electrodes 202, 204 comprise a fine mesh structure, such as a fine woven mesh. A fine mesh, such as a woven mesh, have been found to make an excellent electrode for electrolyzer cells because it provides a high relative surface area, a relatively large open area for electrolyte and gas flow to and from the electrode, and are readily available in sizes that are large enough for a large commercial electrolyzer cell, e.g., with an active area of at least 1 $m^2$, such as from about 1 $m^2$ to about 4 $m^2$.

In an example, a differential fluid pressure can be applied across the separator 210 (e.g., with a pressure on the cathode side of the separator 210 being larger than on the anode side, or vice versa). The differential pressure, in addition to the elastic element 228, 232 can act to load the electrodes 202, 204 and create effective electrical contact across the active area of the electrodes 202, 204 without requiring welding to couple the electrodes 202, 204 to other structures in the electrolyzer cell 200, particularly with fine mesh electrodes.

In an example, the woven mesh of one or both of the electrodes 202, 204 comprises a network of sets of crossing wires, which can be perpendicular or angled relative to one another, that alternative cross and bend over one another. For example, any particular wire alternates between passing under an adjacent cross wire and then over the next cross wire. In an example, one or both of the electrodes 202, 204 can comprise a woven wire mesh electrode formed from wires having a wire diameter of about 0.18 mm diameter with openings in the mesh of about 0.44 mm and with an open area of from about 50% to about 60%, such as from about 50% to about 55%. In an example, one or both of the electrodes 202, 204 is formed from an expanded mesh wherein one or both of the electrodes 202, 204 are fabricated from a sheet of material that is about 0.13 mm thick with a long way of the diamond shape (LWD) of about 2 mm and a short way of the diamond (SWD) of about 1 mm.

In an example, one or both of the anode 202 and the cathode 204 is made primarily or entirely from nickel. Fabricating both the anode 202 and the cathode 204 out of nickel enables the use of non-welded electrodes fabricated from fine woven meshes for both electrodes 202, 204, for example because nickel has a very low contact resistance. In an example, one or both of the anode 202 and the cathode 204 is coated with one or more catalyst materials, e.g., in the form of one or more catalyst coating layers on the electrode 202, 204. In an example, the one or more catalyst materials can be electrically conducting.

The current collector 226, 230 of each electrode assembly 222, 224 acts to distribute current flowing into or out of its respective electrode 202, 204. In an example, the current collector 226, 230 of each electrode assembly 222, 224 comprises a rigid structure, such as a rigid metal plate or mesh, that is electrically connected to its corresponding electrode 202, 204, either directly or indirectly. In an example, each current collector 226, 230 can comprises an expanded metal sheet, such as an expanded nickel sheet.

In an example, each elastic element 228, 232 comprises a compressible and expandable structure that provides a controlled load when compressed. For example, the elastic element 228, 232 can be compressed between the separator 210 and the current collector 226, 230, and the resulting load that results as the elastic element 228, 232 tries to expand back to its fully expanded position acts to load the electrode 202, 204 against the separator 210 to provide a zero-gap configuration between the electrode 202, 204 and the separator 210. In an example, the elastic element 228, 232 is also electrically conductive (e.g., the elastic element 228, 232 is made from or is coated with an electrically conductive material, such as nickel) so that it will conduct electricity from the current collector 226, 230 to the electrode 202, 204 or vice versa. In an example, each of the one or more elastic elements 228, 232 comprise one or more electrically conductive filaments that are woven together into an elastic layer that can expand and collapse to apply the controlled load when the elastic layer is compressed. In some examples, one or both of the elastic elements 228, 232 can be a corrugated knitted mesh having a pre-load of about 2 pounds per square inch at about 3 mm of compression. In an example, an uncompressed thickness of one or both of the elastic elements 228, 232 can be from about 5 mm to about 7 mm. One or both of the elastic elements 228, 232 can have a corrugation pitch of about 10 mm. In an example, one or both of the elastic elements 228, 232 are formed from wire having a wire diameter of about 0.15 mm.

In the example shown in FIG. 2, both the anode assembly 222 and the cathode assembly 224 include an elastic element 228, 232, e.g., such that the anode-side elastic element 228 provides a loading force to compress the anode 202 against one side of the separator 210 and the cathode-side elastic element 232 provides a loading force to compress the cathode 204 against an opposing side of the separator 210. In other examples, discussed below, there is an elastic element on only one side of the separator 210 (e.g., with only the anode assembly 222 having the elastic element 228 and with the cathode assembly 224 omitting the elastic element 232, or vice versa with only the cathode assembly 224 having the elastic element 232 and with the anode assembly 222 omitting the elastic element 228). In such a configuration, the elastic element on only one side of the separator 210 can produce enough compressive load so that both electrodes 202, 204 are compressed against the opposing sides of the separator 210.

In an example, the current collectors 226, 230 can be coupled to their respective pans 214, 218, e.g., so that the current collector 226, 230 is electrically connected to the pan 214, 218, which provides part of the electrical path between the electrode 202, 204 and the pan 214, 218. In order to accommodate this electrical connection between the current collector 226, 230 and its corresponding pan 214, 218, in an example, each pan assembly 212, 216 includes one or more ribs that extend between the electrode assembly 222, 224 and a back wall of the pan. For example, the anode pan assembly 212 can include one or more ribs 234 that extend between a back wall 236 of the anode-side pan 214 and the anode assembly 222, while the cathode pan assembly 216 can include one or more ribs 238 that extend between a back wall 240 of the cathode-side pan 218 and the cathode assembly 224. The one or more ribs 234 can be welded to the back wall 236 of the anode-side pan 214 while the one or more ribs 238 can be welded to the back wall 24 of the cathode-side pan 218.

The one or more ribs 234, 238 of each pan assembly 212, 216 can be electrically coupled to its corresponding electrode assembly 222, 224 by one or more welds. e.g., one or more welds 242 that electrically couple the anode assembly 222 to the one or more ribs 234 of the anode pan assembly 212 and one or more welds 244 that electrically couple the cathode assembly 224 to the one or more ribs 238 of the cathode pan assembly 216. As shown in FIG. 2, in an example, the one or more welds 242 can electrically couple the one or more ribs 234 to the anode current collector 226 and the one or more welds 244 can electrically couple the one or more ribs 238 to the cathode current collector 230.

In an example, the electrodes 202, 204 can be electrically connected to the one or more ribs 234, 238 and the one or more welds 242, 244. In examples where the electrode assembly 222, 224 includes the current collector 226, 230 that is welded to the one or more ribs 234, 238, then the electrode 202, 204 of the electrode assembly 222, 224 can be electrically coupled to the current collector 226, 230 via physical contact between the electrode 202, 204 and the current collector 226, 230, e.g., with the flexible electrode 202, 204 being wrapped around a back side of the current collector 226, 230 so that there is physical contact between the mesh electrode 202, 204 and the current collector 226, 230, and/or through the elastic element 228, 232, which can also be made from a conductive material, such as metal. In an example, each of the mesh electrode 202, 204, the current collector 226, 230, and the elastic element 228, 232 of each electrode assembly 222, 224 can be made from nickel. When the loading pressure across an interface is sufficiently high (e.g., the loading pressure provided by one or both of the elastic element 228, 232 and a differential pressure across the cell, the contact resistance of a contact point between a nickel surface another electrically conductive material is very low, such that when a nickel electrode 202, 204 is in contact with a nickel elastic element 228, 232 or a nickel current collector 226, 230, electricity will readily flow through the contact point between the two nickel structures. As described in more detail below, this can allow the electrodes 202, 204 to be coupled to the electrode assembly 222, 224 without requiring welding between the electrodes 202, 204 and another structure while still providing for low resistance between the electrodes 202, 204 and the rest of the electrolyzer cell 200.

The electrodes 202, 204 can be electrically coupled to the supplied electrical current via the one or more ribs 234, 238 and the one or more welds 242, 244. During operation of the electrolyzer cell 200, current flows from a conductor contacting the anode-side pan 214 (similar to the anode conductor 116 in the electrolyzer cell 100 of FIG. 1), where the current can then flow to the one or more ribs 234 of the anode pan assembly 212 (e.g., through welds between the ribs 234 and the back wall 236), then to the anode current collector 226 via the one or more welds 242, and then into the anode 202 (e.g., via the contact between the anode current collector 226 and the anode 202 or via the electrically-conducting anode-side elastic element 228). The current can then pass between the anode 202 and the cathode 204 via the separator 210. The current then flows from the cathode 204 to the cathode current collector 230 (e.g., via the contact between the cathode 204 and the cathode current collector 230 or via the electrically-conducting cathode-side elastic element 232), where it can then flow from the cathode current collector 230 to the one or more ribs 238 via the one or more welds 244. Then, the current can flow from the one or more ribs 238 to the cathode-side pan 218 (such as via welds between the one or more ribs 238 and the back wall 240 of the cathode-side pan 218), and finally out of the electrolyzer cell 200 via a conductor that is contacting the cathode-side pan 218 (similar to the cathode conductor 126 in the electrolyzer cell 100 of FIG. 1).

The geometry and spacing of the one or more ribs 234, 238 can dictate current flow through the pan assemblies 212, 216. The geometry of the ribs 234, 238 can include, but not limited to, the number of the ribs 234, 238, the height of the ribs 234, 238 (e.g., the distance between the back wall 236, 240 and the electrode assembly 222, 224 to which the ribs 234, 238 are connected), the physical design of the ribs 234, 238, the pitch between adjacent ribs 234, 238, and/or the thickness of the ribs 234, 238. As the current flows in through the ribs 234, 238 and the welds 242, 244, the geometry, spacing or density, and/or cross-sectional area of the welds 242, 244 can also impact current flow through the pan assemblies 212, 216. For example, as increasingly high currents flow through the cell, the density and the cross sectional area of the welds 242, 244 can impact local Joule heating and the formation of local hot spots, which can cause damage to the separator 210. In an example, the geometry, spacing, and cross-sectional area of the ribs 234, 238 and/or the welds 242, 244 can facilitate efficient operation of the electrolyzer cell 200 at high current densities.

Further details regarding geometries and other configurations of the one or more ribs 234, 238 and the one or more welds 242, 244 for coupling the one or more ribs 234, 238 to the electrode assemblies 222, 224 (e.g., to the current collectors 226, 230) are described in U.S. Pat. No. 11,390,956, issued on Jul. 19, 2022, entitled "ANODE AND/OR CATHODE PAN ASSEMBLIES IN AN ELECTROCHEMICAL CELL, AND METHODS OF USE AND MANUFACTURE THEREOF." the disclosure of which is incorporated herein by reference in its entirety.

In an example, one or both of the pan assemblies 212, 216 also include a baffle plate that is fitted within its corresponding pan 214, 218 that is generally aligned with the orientation of the pan 214, 218 and the electrode assembly 222, 224 of that particular pan assembly 212, 216. For example, the anode pan assembly 212 can include an anode-side baffle plate 246 located within the interior of the anode-side pan 214 and the cathode pan assembly 216 can include a cathode-side baffle plate 248 located within the interior of the cathode-side pan 218. Each baffle plate 246, 248 is coupled to its corresponding set of one or more ribs 234, 238 to position the baffle plate 246, 248 within its corresponding pan 214, 218, e.g., at a specified position relative to its corresponding electrode assembly 222, 224 and/or its corresponding back wall 236, 240.

In an example, one or both of the baffle plates 246, 248 comprise a solid plate that is configured to fit over or within the one or more ribs 234, 238 of its corresponding pan assembly 212, 216. In other examples, one or both of the baffle plates 246, 248 can comprise an expanded metal plate or a mesh. In an example, one or both of the baffle plates 246, 248 are made from a conductive metal, such as, but not limited to, nickel, stainless steel, and the like. In another example, one or both of the baffle plates 246, 248 are made from a polymeric material.

As will be appreciated by those having skill in the art, the contribution of internal power dissipation to the internal temperature distribution within the electrolyzer cell 200 can be reduced or minimized through operating conditions such as the temperature and flow rate of the electrolyte flowing through the electrolyzer cell 200 (e.g., through the pan assemblies 212, 216). High electrolyte flow rates can increase and in some examples maximize convective heat transfer within the electrolyzer cell 200, thereby helping to reduce or minimize heat buildup and the corresponding concomitant temperature rise within the cell 200 that could otherwise result from high current densities. The baffle plates 246, 248 can provide for mixing of electrolyte as it flows through the pan assemblies 212, 216 to enhance convective heat transfer within the electrolyte during electrolysis.

In some examples, the baffle plate 246, 248 is designed and positioned in its corresponding pan 214, 218 in such a way that the gas produced at the electrode assembly 222, 224 can mix with the electrolyte on the side of the baffle plate 246, 248 closest to the electrode assembly 222, 224, resulting in a relatively low density column and defining a riser section. The low density mixture can rise relatively quickly through the riser section. Once above the top of the baffle plate 246, 248, the gas can disengage and flow into an outlet (such as a manifold, not shown in FIG. 2). A fraction of the electrolyte may then drop back down the side of the baffle plate 246, 248 closer to the back wall 236, 240 of the pan 214, 218 (i.e., the side opposite to the electrode assembly 222, 224) into a down-corner region, thereby creating a circulation loop.

The gas evolved at the electrode 202, 204 impacts the flow of the electrolyte, dragging some of the electrolyte up, and buffeting some of the electrolyte laterally. Gas lift occurs along the region adjacent to the electrode assembly 222, 224. The presence of the baffle plate 246, 248 creates a strong circulation within the pan assembly 212, 216. The flow of electrolyte in the riser section on the side of the baffle plate 246, 248 closest to the electrode assembly 222, 224 is strongly oriented upward due to gas lift, and the flow in the down-corner section on the side of the baffle plate 246, 248 closest to the back wall 236, 240 is strongly oriented downward. The relatively high velocities and shear rates in the riser section help sweep gas from the electrode assembly 222, 224, provide efficient top to bottom mixing within the pan 214, 218, and drive increased convective cooling.

The baffle plate 246, 248 can be used to create a rapidly flowing circulation loop so that the electrolyte remains substantially isothermal as it flows through the pan assemblies 212, 216. Due to the high degree of top-bottom mixing and circulation, rapid thermal equilibration of the electrolyte can be achieved as it flows into and through the pan assemblies 212, 216. Another advantage is that relatively cold electrolyte can be introduced into the pan assembly 212, 216 which can equilibrate with warm circulating electrolyte fluid relatively quickly. The circulation rate (or laps of the recirculation loop during electrolyte transit through the pan 214, 218) can be anywhere from 1 to 200. The high circulation rate can also drive larger shear rates adjacent to the separator 210, helping to sweep gas away from the separator 210 and/or enhance or maximize heat transfer from the separator 210 to the electrode 202, 204.

Further details regarding a baffle plate in the pan assemblies 212, 216 are described in U.S. Pat. No. 11,444,304, issued on Sep. 13, 2022, entitled "ANODE AND/OR CATHODE PAN ASSEMBLIES IN AN ELECTROCHEMICAL CELL, AND METHODS TO USE AND MANUFACTURE THEREOF," the disclosure of which is incorporated herein by reference in its entirety.

The pan assemblies 212, 216 can be coupled together to enclose the interior of the electrolyzer cell 200. For example, a flange 250 of the anode-side pan 214 can be coupled to a corresponding flange 252 of the cathode-side pan 218, such as with one or more fasteners 254. In the example shown in FIG. 2, the one or more fasteners 254 include one or more bolts and corresponding nuts that can be used to securely affix the flanges 250 and 252 together to enclose the interior of the pans 214, 218 and form the overall electrolyzer cell 200.

The electrodes 202, 204 of the electrolyzer cell 200 are coupled to the other structures of its pan assembly 212, 216 without the use of welding of the electrode 202, 204. In other words, the anode 202 is not welded to any structure of the anode assembly 222 or the anode pan assembly 212 and the cathode 204 is not welded to any structure of the cathode assembly 224 or the cathode pan assembly 216. As discussed above, the catalyst coating that may be present on the anode 202 or the cathode 204, or both, has a finite life during operation of the electrolyzer cell 200. Moreover, the catalyst coating tends to lose activity over time such that eventually one or both of the electrodes 202, 204 will have to be replaced in order to refresh the catalyst coating. In the example discussed above with respect to FIG. 2, each electrode 202, 204 is simply placed into close contact with its corresponding current collector 226, 230 and/or its corresponding elastic element 228, 232. In particular, in examples where the electrodes 202, 204 and one or both of the current collector 226, 230 and the elastic element 228, 232 comprise nickel, the low contact resistance in a nickel-to-nickel interface makes the use of non-welded electrodes 202, 204 particularly feasible. However, in other examples, one or both of the electrode assemblies 222, 224 can include one or more fastening structures.

Figure 3:
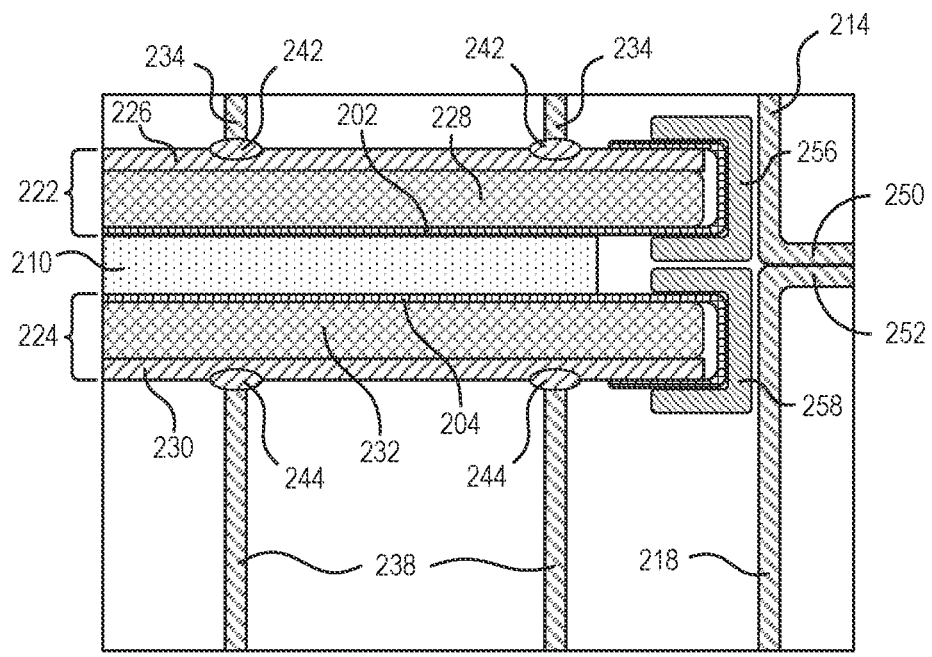
FIG. 3 is a close-up cross-sectional view of an example anode assembly and cathode assembly of the example electrolyzer cell of FIG. 2.
Figure 4:
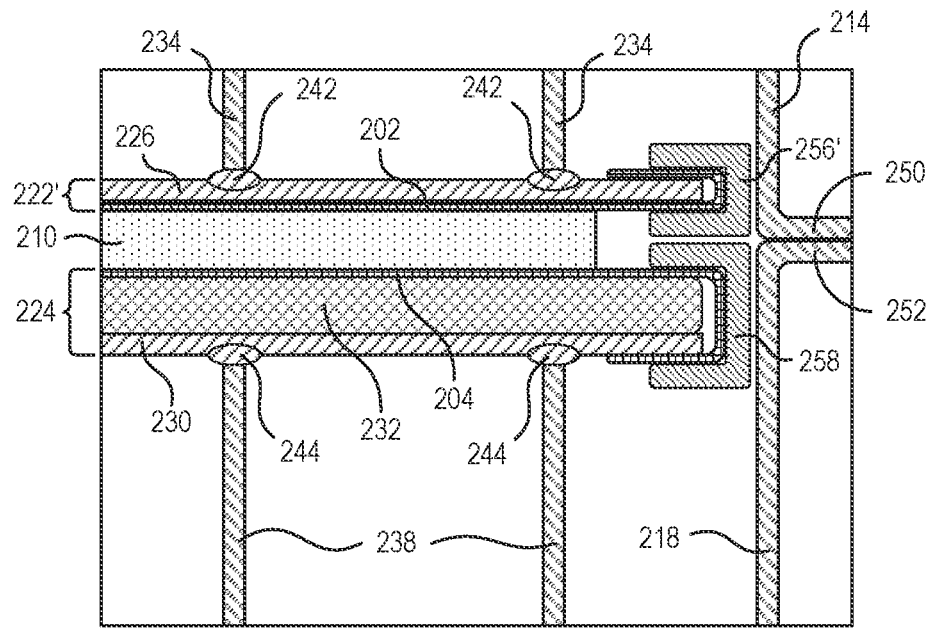
FIG. 4 is a close-up cross-sectional view of another example anode assembly and cathode assembly of the example electrolyzer cell of FIG. 2.

FIGS. 3 and 4 show examples wherein the electrode assemblies 222, 224 include a fastening structure that do not include welding the electrode 202, 204 to another structure, that is without any welds on the electrodes 202, 204. For example, as shown in FIG. 3, the anode assembly 222 includes a fastening structure in the form of a clamp 256 that fits over the anode assembly 222 to clamp the anode 202, the anode-side elastic element 228, and the anode current collector 226 together. Similarly, the cathode assembly 224 can include a corresponding fastening structure in the form of a clamp 258 that fits over the cathode assembly 224 to clamp the cathode 204, the cathode-side elastic element 232, and the cathode current collector 230 together. In an example, each clamp 256, 258 can exert a clamping force against its corresponding electrodes 202, 204 and/or its corresponding current collector 226, 230. For example, one or both of the clamps 256, 258 can be made from a resilient material and can be sized to be slightly smaller than the combined thickness of the electrode 202, 204, the elastic element 228, 232, and the current collector 226, 230 so that when the clamp 256, 258 is fitted over the electrode assembly 222, 224, the clamp 256, 258 will exert the clamping force against the electrode 202, 204 and/or the current collector 226, 230. In an example, the clamps 256, 258 are relatively thin so that the clamps 256, 258 will not increase the separation between the current collectors 226, 230, e.g., such that the clamps 256, 258 do not come into contact or interfere with other structures of the cell 200.

FIG. 3 shows an example wherein both the anode assembly 222 and the cathode assembly 224 include a corresponding elastic element 228, 232, e.g., so that the anode-side elastic element 228 exerts a first controlled load onto the anode 202 in order to compress the anode 202 into a first side of the separator 210 and provide a zero-gap architecture on the anode side of the separator 210 and so that the cathode-side elastic element 232 exerts a second controlled load onto the cathode 204 in order to compress the cathode 204 into an opposing second side of the separator 210 and provide a zero-gap architecture on the cathode side of the separator 210. However, as discussed above, the electrolyzer cell is not limited to a configuration where both electrode assemblies 222, 224 comprise an elastic element.

FIG. 4 shows an example wherein only one of the electrode assemblies comprises an elastic element. In FIG. 4, structures that are the same or substantially the same as in the example of FIG. 3 are given the same reference number. The only difference between the example electrolyzer cell of FIG. 3 and that of FIG. 4 is that the anode assembly 222' in FIG. 4 only includes the anode 202 and the anode current collector 226 and does not include an anode-side elastic element. Instead, the elastic element 232 that is part of the cathode assembly 224 is configured so that it can produce a sufficient controlled load to both compress the cathode 204 into the separator 210 and to also compress the separator 210 into the anode 202 to provide a zero-gap architecture on both the anode side and the cathode side of the separator 210. In the example shown in FIG. 4, the anode 202 is only in contact with the anode current collector 226, and the corresponding clamp 256' is smaller because it only has to fit over the combined thickness of the anode 202 and the anode current collector 226. The cathode assembly 224 in FIG. 4 is the same or substantially the same as described above for the example of FIG. 3.

Other coupling structures can be used to ensure the electrical contact between one or both electrodes 202, 204 and their corresponding current collector 226, 230 and/or corresponding elastic element 228, 232. FIGS. 5A-5C show a cross-sectional view of a portion of one of the electrode assemblies in an electrolyzer cell with an edge insert 260 that can be inserted into a seam 262 that is formed between the electrode assembly and the pan. The edge insert 260 can include one or more structures that provide for non-welded coupling of the electrode to its corresponding current collector and/or to its corresponding elastic element. FIGS. 5A-5C show an example wherein the edge insert 260 is used to couple and secure the cathode 204 to the cathode current collector 230 and/or to the cathode-side elastic element 232 to form a cathode assembly 224, wherein the edge insert 260 is used along the seam 262 between the cathode assembly 224 and the cathode-side pan 218. FIGS. 5A-5C also do not depict the corresponding anode assembly 222 and the structures associated with the anode half cell. Those having skill in the art, however, will appreciate that a similar or identical edge insert 260 could be used to couple and/or secure the anode 202 to the anode current collector 226 and/or to the anode-side elastic element 228 along a seam between the anode assembly 222 and the anode-side pan 214.

In the example shown in FIGS. 5A-5C, the edge insert 260 includes a top cover portion 264, a seam portion 266, and an optional flange portion 268. In an example, the top cover portion 264 is sized and configured to fit over the cathode 204 on the same side of the cathode 204 onto which the separator 210 will be positioned. The top cover portion 264 can also be configured so that if any of the wires that form the elastic element 232 poke out through the open space of the mesh cathode 204, they will not come into contact with the separator 210. As will be appreciated by those having skill in the art, it is common for the ends of the wires at the edges of the elastic element 232 to poke through and damage the separator 210, for example by puncturing or otherwise putting a hole through the separator 210. In this way, the top cover portion 260 can protect the separator 210 from puncture by loose protruding wire ends of the elastic element 232.

In an example, the seam portion 266 is sized and configured to fit into the seam 262 between the cathode assembly 224 and the cathode-side pan 218. This seam 262 can be relatively narrow, e.g., from about 1 mm to about 5 mm, such as about 2 mm or less, so that the seam portion 266 should be narrower than this small gap. The relatively narrow seam portion 266 can allow a person assembling the electrolyzer cell to simply insert the seam portion 266 of the edge insert 260 into the gap formed at the seam 262 without having to use any tools or other special equipment to do so. This greatly simplifies the installation process for the person assembling the electrolyzer cell.

In an example, the edge insert 260 can also include one or more structures to engage the electrode assembly 224. In the example shown in FIGS. 5A-5C, the edge insert 260 includes a deformable protrusion 270 located on the seam portion 266. In the example shown, the protrusion 270 is located at a distal end of the seam portion 266, but the protrusion 270 could be located at another position along the seam portion 266, for example if the seam portion 266 were longer than the combined thickness of the cathode 204, the current collector 230, and the elastic element 232. As can be seen in FIG. 5A, the protrusion 270 can be configured to protrude from the seam portion 266 on the same side of the seam portion 266 that will be positioned proximate to the cathode assembly 224. The protrusion 270 can be deformable between an extended position and a compressed position. When the seam portion 266 is inserted into the gap between the cathode assembly 224 and the pan 218 at the seam 262, the deformable protrusion 270 will be deformed (e.g., compressed) toward the seam portion 266 by the cathode 204 so that the protrusion 270 moves from its extended position (as shown in FIG. 5A) to its compressed position (as shown in FIG. 5B). The deformation of the protrusion 270 can allow the seam portion 266 and the protrusion 270 to fit within the gap between the cathode 204 and the wall of the pan 218. After the seam portion 266 has been inserted far enough into the seam 262, the protrusion 270 will no longer be engaged by the cathode 204 such that the protrusion 270 can spring back away from the seam portion 266 toward its extended position, as shown in FIG. 5C. When the protrusion 270 has returned to its extended position, the protrusion 270 can engage a back side of the cathode 204, e.g., the portion of the cathode 204 that has been folded over the back side of the cathode current collector 230. In an example, the protrusion 270 can provide a clamping force similar to the clamping force discussed above with respect to the clamps 256, 258 in FIG. 3.

In an example, the edge insert 260 is an elastic edge insert comprising at least one structure that elastically engages the electrode assembly 222, 224 to which the edge insert 260 is coupling. In an example, the elastic structure that elastically engages the electrode assembly 222, 224 is the protrusion 270 described above.

In an example, the flange portion 268 of the edge insert 260 can be configured to fit over the flange 252 of the pan 218. The flange portion 268 can provide additional stability for the edge insert 260 after it has been inserted into position and can also provide further assurance that the edge insert 260 will be inserted to a proper desired depth relative to the cathode assembly 224 and the pan 218 and that the edge insert 260 will be oriented as desired relative to the cathode assembly 224 and the pan 218.

In an example, the edge insert 260 can be sized so that it extends along a substantial length of the seam 262, e.g., along all or substantially all of at least one edge of the electrode assembly 222, 224. In another example, the edge insert 260 can have a length that is shorter than the length of the seam 262 along the edge of the electrode assembly 222, 224, but a plurality of edge inserts 260 can be used around the periphery of the electrode assembly 222, 224 to secure the electrode assembly 222, 224 together so that there will be sufficient electrical contact between each electrode 202, 204 and its corresponding current collector 226, 230 and/or its corresponding elastic element 228, 232.

In an example, the edge insert 260 is made from a plastic or other polymeric material. The plastic or polymeric material is preferably chemically inert and resistant to the electrolyte that will be flowing through the corresponding pan 214, 218. In an example, the plastic or polymeric material of the edge insert 260 comprises a moldable material, such as an injection moldable thermoplastic, including, but not limited to, polypropylene, polyethylene, acrylonitrile butadiene styrene (ABS), nylon, and polyethylene terephthalate (PET).

In the example of FIGS. 5A-5C, the electrode 204 is bent from the separator side of the electrode assembly 224 (i.e., the top side of FIGS. 5A-5C) around to the back side of the electrode assembly 224 so that a portion of the electrode 204 is in contact with the current collector 230, and the edge insert 260 engages the electrode 204 on the back side of the electrode assembly 224 (e.g., the protrusion 270 engages with a back side of the electrode 270). In another example, shown in FIG. 6, the electrode assembly 224' is configured so that the electrode 204' is only positioned on the separator side of the electrode assembly 224' and the electrode 204' does not wrap around the electrode assembly 224' and contact the current collector 230. In such an example, the loading force exerted by the elastic element 232 is sufficient to hold the electrode 204' in place relative to the rest of the electrode assembly 224' and the edge insert 280 is not actually configured to secure the electrode 204' to the electrode assembly 224'. Rather, the edge insert 280 is configured simply to prevent wires or other structures at the edge of the electrode assembly 224' from projecting into and damaging the separator, as discussed above. Otherwise, the edge insert 280 can be substantially similar or identical to the edge insert 260 of FIGS. 5A-5C that engages the electrode 204 on the back side of the electrode assembly 224. For example, the edge insert 280 can include a top cover portion 282, a seam portion 284, and an optional flange portion 286, which can serve similar or identical functions to the top cover portion 264, the seam portion 266, and the flange portion 268 of the edge insert 260.

In an example, the edge insert 280 includes a deformable protrusion 288 located on the seam portion 284, for example at a distal end of the seam portion 284. The protrusion 288 can be similar to the protrusion 270, for example by being configured to protrude from the seam portion 284 on the side of the seam portion 284 that will be positioned proximate to the electrode assembly 224' (e.g., on the side opposite to the flange portion 286). The protrusion 288 can be deformable between an extended position and a compressed position so that when the seam portion 284 is inserted into the gap between the electrode assembly 224' and the pan 218, the deformable protrusion 288 will be deformed (e.g., compressed) toward the seam portion 284 so that the protrusion 288 moves from its extended position to its compressed position (similar to the movement of the protrusion shown between FIGS. 5A and 5B). After the seam portion 284 has been inserted far enough into the seam, the protrusion 288 will no longer be engaged by the electrode assembly such that the protrusion 288 can spring back toward its extended position and engage a back side of the current collector 230.

The use of non-welded electrodes 202, 204—e.g., with the bendable and formable electrode 202, 204 bent around the rest of the electrode assembly 222, 224 (as shown in the example of FIG. 2), with a fastening structure (such as the clamps 256, 258 shown in FIGS. 3 and 4), with the edge insert 260, 280 of FIG. 5A-5C or 6, or with some other coupling or fastening structure-simplifies the electrode replacement procedure tremendously. Maintenance is as simple as removing the cell 200 from the electrolyzer, removing one or both electrodes 202, 204 (e.g., by removing the non-welded fastening or coupling structure), optionally replacing one or both of the elastic elements 228, 232, and positioning one or both new electrodes 202, 204, and (optionally) repositioning the non-weld fastening or coupling structure. No machining and no welding of the electrodes 202, 204 is required, and the number of cell components requiring replacement is reduced, and in some examples minimized. Turnover can be performed at the plant or at a central facility quickly without the need for highly skilled, specialized labor, or large and expensive equipment.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An electrolyzer cell comprising:
a housing comprising one or more walls enclosing a cell interior;
a first current collector connected to the housing within the cell interior;
a second current collector connected to the housing within the cell interior;
a first electrode coated with a first catalyst coating positioned in the cell interior, wherein the first electrode is electrically coupled to the first current collector without being directly attached to the first current collector or to the housing;
a second electrode positioned in the cell interior, wherein the second electrode is electrically coupled to the second current collector;
a separator positioned between the first electrode and the second electrode, wherein a voltage is applied between the first electrode and the second electrode; and
a first non-welded fastening structure configured to clamp the first electrode to the first current collector without directly attaching the first electrode to the first current collector to form a first electrode assembly that is separate from the separator; and
wherein the first current collector, the first electrode, the second current collector, the second electrode, and the separator are located entirely inside the one or more walls within the cell interior.

2. The electrolyzer cell of claim 1, wherein the first non-welded fastening structure comprises an edge insert.

3. The electrolyzer cell of claim 1, wherein the first electrode comprises a first mesh sheet.

4. The electrolyzer cell of claim 1, wherein the second electrode comprises a second mesh sheet.

5. The electrolyzer cell of claim 1, further comprising an elastic element configured to compress at least a portion of the first electrode into the separator.

6. The electrolyzer cell of claim 1, wherein the second electrode is coated with a second catalyst coating.

7. The electrolyzer cell of claim 1, wherein the first current collector is welded to the housing.

8. A method comprising:
providing a first electrode coated with a first catalyst coating and a second electrode;
positioning the first electrode proximate to a first current collector that is connected to a housing of an electrolyzer cell and is located within a cell interior of the electrolyzer cell so that the first electrode is electrically coupled to the first current collector;
positioning the second electrode proximate to a second current collector that is connected to the housing in the cell interior so that the second electrode is electrically coupled to the second current collector;
positioning a separator between the first electrode and the second electrode;
placing a first non-welding fastening structure onto the first electrode and the first current collector so that the first non-welding fastening structure applies a clamping force to clamp the first electrode to the first current collector to form a first electrode assembly that is separate from the separator so that the first electrode is electrically connected to the first current collector without being directly attached to the first current collector or to the housing;
wherein the housing comprises one or more walls enclosing the cell interior, wherein the first current collector, the first electrode, the second current collector, the second electrode, and the separator are located entirely inside the one or more walls within the cell interior;
feeding electrolyte into the cell interior; and
applying a voltage between the first electrode and the second electrode to generate hydrogen gas at the first electrode or at the second electrode.

9. The method of claim 8, wherein the first electrode comprises a first mesh sheet.

10. The method of claim 8, wherein the second electrode comprises a second mesh sheet.

11. The method of claim 8, further comprising positioning an elastic element between the first current collector and the first electrode before placing the first non-welded fastening structure so that the clamping force provided by the first non-welding fasting structure clamps the first electrode, the elastic element, and the first current collector together to form the first electrode assembly, wherein the elastic element is configured to compress at least a portion of the first electrode into the separator.

12. The electrolyzer cell of claim 2, wherein the edge insert comprises a cover portion that is configured to fit over an edge portion of the first electrode between the first electrode and the separator.

13. The electrolyzer cell of claim 12, wherein the edge insert further comprises a seam portion that is configured to be inserted into a seam between the first electrode and one of the one or more walls of the housing.

14. The electrolyzer cell of claim 1, wherein the housing comprises a first pan and a second pan,
wherein the first pan comprises one or more first walls at least partially enclosing a first pan interior and the second pan comprises one or more second walls at least partially enclosing a second pan interior,
wherein the first electrode, the first current collector, and the first non-welded fastening structure are located within the first pan interior, and wherein the second electrode and the second current collector are located within the second pan interior,
wherein the first pan interior and the second pan interior form the cell interior, and
wherein the first pan and the second pan are coupled together to form the housing and enclose the cell interior.

15. The electrolyzer cell of claim 14, wherein the first pan comprises a first flange and the second pan comprises a second flange, wherein the first pan and the second pan are coupled together by coupling the first flange to the second flange.

16. The method of claim 8, wherein the non-welded fastening structure comprises an edge insert comprising a cover portion, the method further comprising placing the edge insert so that the cover portion fits over an edge portion of the first electrode so that the cover portion will be between the first electrode and the separator to protect an edge of the separator.

17. The electrolyzer cell of claim 5, wherein the first non-welding fastening structure is configured to clamp the first electrode, the elastic element, and the first current collector together as an electrode assembly.

18. The electrolyzer cell of claim 1, wherein the second electrode is electrically coupled to the second current collector without being directly attached to the second current collector,
wherein the electrolyzer cell further comprises a second non-welding fastening structure configured to clamp the second electrode to the second current collector to form a second electrode assembly that is separate from the separator, wherein the second non-welding fastening structure does not couple the second electrode or the second current collector to the separator.

19. The electrolyzer cell of claim 18, further comprising an elastic element configured to compress the second electrode into the separator, wherein the second non-welding fastening structure is configured to clamp the second electrode, the elastic element, and the second current collector together into an electrode assembly.

20. The method of claim 8, further comprising placing a second non-welding fastening structure onto the second electrode and the second current collector, wherein the second non-welding fastening structure applies a clamping force to clamp the second electrode to the second current collector to form a second electrode assembly that is separate from the separator and so that the second electrode is electrically coupled to the second current collector without being directly attached to the second current collector.

* * * * *